United States Patent [19]

Koistinen

[11] 4,381,623

[45] May 3, 1983

[54] ADD-WATER FUNNEL AND CARD HOLDER

[75] Inventor: Arnold A. Koistinen, Watertown, S. Dak.

[73] Assignee: Dakota Plastics Company, Watertown, S. Dak.

[21] Appl. No.: 335,325

[22] Filed: Dec. 28, 1981

[51] Int. Cl.³ .............................................. A01G 29/00
[52] U.S. Cl. ....................................................... 47/48.5
[58] Field of Search .................... 47/1, 48.5, 41, 41.11, 47/41.12, 41.2, 79; 40/10, 10 C, 11 R, 23 R, 23 A; 24/341, 124, 324, 67.3, 67.9, 67.11, 243, 255 R, 259 R

[56] References Cited

U.S. PATENT DOCUMENTS

| | | | |
|---|---|---|---|
| 2,040,750 | 5/1936 | Long | 40/11 R X |
| 2,717,463 | 9/1955 | Sindler | 40/11 R X |
| 2,809,468 | 10/1957 | Eliot | 47/48.5 X |
| 3,057,093 | 10/1962 | Gallo | 40/10 C |
| 3,066,447 | 12/1962 | Reiterer et al. | 47/47 |
| 3,177,617 | 4/1965 | Koistinen | 47/41.11 |
| 4,037,361 | 7/1977 | Murphy et al. | 47/48.5 |
| 4,170,948 | 10/1979 | Strickland | 47/48.5 X |

FOREIGN PATENT DOCUMENTS 202146  9/1908  Fed. Rep. of Germany ....... 47/48.5

Primary Examiner—James R. Feyrer
Attorney, Agent, or Firm—Harvey B. Jacobson

[57] ABSTRACT

A sculptured water funnel and card holder structure insertable into a block of floral foam or the like to supply water to cut flowers having their cut ends inserted into the block. The structure includes a funnel which may be molded together with a card holder and a retainer clip, so that when the card holding element is detached from the funnel, the clip secures the card holder onto a lip of the funnel. The lower end of the funnel is joined to an upper end of a tubular member for exiting water from its lower end. The tubular member is supported by an insertion device received into the lower end thereof and has its other end received into a floral foam block. A barrier is provided at an intermediate point of the insertion device tending to preclude insertion of the barrier into the foam beyond the adjacent surface of the foam.

9 Claims, 5 Drawing Figures

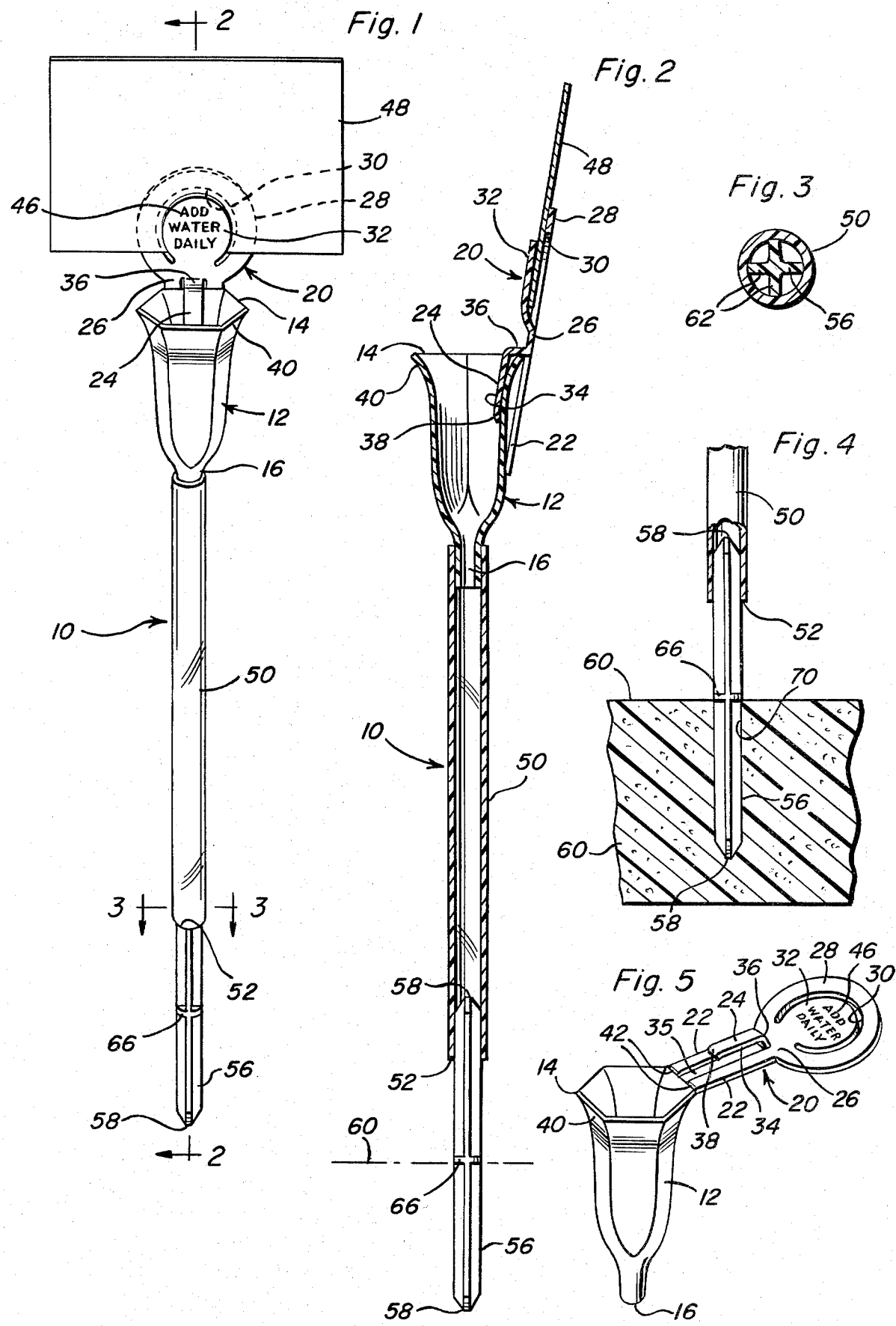

ADD-WATER FUNNEL AND CARD HOLDER

CROSS REFERENCE TO RELATED APPLICATION

This application is a co-pending application to Joseph S. Gallo, Sr., Ser. No. 324,864, filed Nov. 25, 1981, titled Water Funnel and Card Holder for Cut Flowers and owned by the same assignee.

BACKGROUND OF THE INVENTION

The invention relates to a water funnel and card holder arrangement for cut flowers which includes a tapered insertion device inserted into a block of foam plastic material. More particularly, the invention is directed to a new combination including a water funnel and card holder structure in which the funnel passes water into a tubular member terminating in an insertion supporting device having a set of fins forming a tip to taper fit into the tubular member as well as extend securely into the foam block at least to a barrier element intermediate the length of the insertion device. Thus water will pass from the funnel through the tubular member and onto and over the foam material, which also receives cut flowers, and the result is achieved that the water provides for prolonging of the "life" of the cut flowers.

FIELD OF THE INVENTION

The present invention provides improvements in assembly and use of watering devices and card holder arrangements, long generally known to be extremely fragile and cumbersome in uses in the field or uses indoors. In such locations flowers usually sit for short periods of time but generally long enough that the flowers sit in place and dry out from lack of water or plant food components often added to the water. The present invention is a combination of elements simply constructed for assembly and disassembly, as needed, and results in an assembly primarily for providing watering to such floral arrangements in which the assemblage extends above the floral arrangements. By means of the tubular member which can be cut to a given length, adjustment in the over-all height of the assemblage is determinable and the arrangement can be supported from a foam block by fins constructed on the taper tip member fitted into the lower tubular member.

A card holder has attached to it a retaining clip member with or without a detent element, in which the clip member is secured onto an edge of the funnel in fixed engagement.

DESCRIPTION OF THE PRIOR ART

Many forms of card holders, clips, watering arrangements and supports are known, such as those listed in the foregoing referenced application, but none of the listed patents, whether taken and viewed singly or in combination with each other, are believed to have a bearing on the patentability of any claim of this invention.

SUMMARY OF THE INVENTION

An object and advantage of the present invention is to provide an arrangement of parts that can be made together, assembled together and stay together in the assembled form, the card holder engagingly clipped onto the funnel, the fins of the insertion device tapered to fit into the tubular member and into the foam block, and the funnel constructed to fittingly engage with the tubular member.

Another object of the invention is to provide an improved flower watering and card display and supporting arrangement of durable construction, ease of assembly and economy of cost that accomplish the various functions of the component parts as well as provide adjustment in length and height of some of the parts.

An additional object of the invention is to provide an arrangement that facilitates ease of watering and identifying of cut flowers and water is conveyed beyond the barrier proximate the surface of the block, the water flowing through the lower end of the tubular member. The card holder need not be removed or disassembled from the assemblage in order to add water to the arrangement.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a front perspective view of a preferred embodiment of the present invention.

FIG. 2 is a sectional view taken along lines 2—2 of FIG. 1.

FIG. 3 is a sectional view taken along lines 3—3 of FIG. 1.

FIG. 4 is a sectional view of a foam plastic block having a tubular member with its insertion device and fins extending therein and into the block.

FIG. 5 is a reduced perspective view illustrating that the funnel and card holder can be made as a unitary structure and notched for separation.

DESCRIPTION OF THE PREFERRED EMBODIMENT

Referring now to the drawings there is shown an assembly 10 having a sculptured or contoured water funnel 12 with a large upper opening 14 and a small lower opening 16, a card holder 20 having a downwardly extending support member having a flat surface of unitary construction or a set of flat legs 22, a contoured clip 24 extending forwardly from a midpoint 26, and a circularly shaped card holding element 28 having a generally C-shaped cut 30 extending around and within the circular card holding element and that forms a tongue 32 adjoined about or near the midpoint 26. The material forming the assembly is of metal or plastic and having some measure of resiliency.

The clip 24 is constructed and contoured throughout its length so that its central portion 34 is generally flat and parallel with the support member or set of legs 22, having a width of the free space 35 defined between the set of legs 22, having an extension 36 at the connective end with the midpoint 26. One form of the invention provides for having at its free end a biting projection 38. The funnel 12 has a flared lip 40 proximate the upper opening 14, so that applying the card holder 20 to the funnel, the flat surface of unitary construction or the set of lets 22 are positioned on an outside of the flared lip 40 with the clip 24 being received on an inside surface of the flared lip. The resiliency inherent in the material provides for the clip to be bent or biased in its application onto the funnel and when in its final position, as shown in FIGS. 1 and 2, the projection 38 bites into the inner and arcuate surface of the funnel for securing the card holder firmly in place.

A form of the invention provides for the support member to have opposite edges thereof which frictionally engage opposite inside walls of the sculptured funnel. Similarly, the opposite edges of legs 22 are inserted or fitted into the funnel 12 where friction between the legs and the funnel walls hold the card holder in place. The card holder with card 48 can then be easily removed and then replaced in the funnel when adding water to the funnel for watering the arrangement, or it is easily removed if the recipient or user just wants to discard the holder and card for appearance's sake in regard to the arrangement.

FIG. 5 illustrates how the funnel 12 and the card holder 20 are constructed by molding or the like as a unitary structure and on which is formed a notched or tear line 42 formed at an edge of the opening 14 and an end of the surface of unitary construction or the set of legs 22, as shown, so that the funnel and card holder are severable, as earlier shown in FIGS. 1 and 2. The funnel may be constructed as a cone or as a polygonal cone surface, such as the hexagonal conic surface of the funnel in FIGS. 1, 2 and 5. The set of legs, in such case, or the unitary construction, respectively, is formed onto a selected side or edge surface of the polygonal surface.

The card holder as attached to the sculptured funnel when molded and thus provides for ease in being picked up as a single unit and the card can be inserted into the card holder portion; when the card holder is broken free from the funnel, then the card holder is inserted with the card into the funnel rather than having to handle several separate units. This arrangement saves time for the florist in handling and assembling the components and prevents loss of either the card holder or funnel from each other. The card holder, however, can be molded as a separate unit.

The tongue 32 is provided with printed instructional indicia 46 for use by consumers and a message device or card 48 having similar indicia, not shown, is positioned in clamped relation due to said resiliency characteristics, between the tongue 32 and element 28 so that the tongue 32 is positioned forward of the card with its indicia exposed for use as shown.

The lower opening 16 of the funnel forms a male coupling for engaging a length of a hollow tubular member 50 forming a midsection of the combination or assembly 10. The member 50 is constructed of a material similar to that of the funnel and card holder, and is provided for being cut into convenient lengths determined by the kind of flowers or flower stems to be associated in the flower array or spray. The lower terminus 52 of the tubular member is formed by a cut as described above, and a long, cruciform or multi-finned member 56 having tapered tips 58 at each of its ends, the upper tip for forming a tapered fit into the midsection of the tubular member, and the lower tip for extending into a tapered fit into a section of floral foam 60 shown in FIGS. 2 and 4. The finned member 56 has at least one fin diametrically configured, or two ribs, or, in the alternative, it has several fins 62 as seen in FIGS. 1-4. Located at an intermediate area between the end tips 58 is a flange structure or barrier 66 for preventing the finned member 56 from extending too deep into the floral foam and also providing gauging or metering of water flow from the funnel through the tubular member and into the floral foam. The distance that the barrier 66 is positioned from the terminus 52, taken together with the permeability of water into the floral foam, determines in some measure the amount of water flow, realizing that close contact of the barrier with the terminus shuts the water flow and increasing distance proportionally measure increased water flow.

The taper-ended finned member 56 frictionally fits into the tubular member and the floral foam. The floral foam may have prepared holes for receiving the finned members, or the floral foam may have its holes 70 created by the finned members and the projection of the barrier 66 and tubular member following the finned member.

An amount of taper of the finned member 56 is observable in FIG. 4, inter alia.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A water funnel arrangement for cut flowers including a structure for funnelling water onto a surface of a body of foam material for receiving cut ends of cut flowers, the arrangement comprising a funnel, the funnel having a large opening for receiving water and a small opening for passing water therefrom, a tubular member having an opening at its upper end connected with the small opening of the funnel and for passing water through the tubular member and for exit of the water at the lower end onto a body of foam material, an elongated longitudinal fin equipped insertion means being received into the lower end of the tubular member for allowing the passage of water and for insertion into said body of foam material, the insertion means having barrier means intermediate its length for limiting the depth of insertion of the insertion means by engaging the surface of the foam material and for varying the flow of water from the lower end of the tubular member by varying, slightly, the spacing of said barrier means from the lower end of the tubular member.

2. A water funnel arrangement for cut flowers including a structure for funnelling water onto a surface of a body of foam material for receiving cut ends of cut flowers, the arrangement comprising a funnel, the funnel having a large opening for receiving water and a small opening for passing water therefrom, a tubular member having an opening at its upper end connected with the small opening of the funnel and for passing water through the tubular member and for exit of the water at the lower end onto a body of foam material, an elongated insertion means being received into the lower end of the tubular member for allowing the passage of water and for insertion into said body of foam material, the insertion means having barrier means intermediate its length for limiting the depth of insertion of the insertion means by engaging the surface of the foam material, a card holder also formed of molded material, the card holder being oblong for forming a holder means at a free end and a support means at another end terminating in a severable notched means secured to the funnel for being severed from the funnel, the support means frictionally engaging alternate walls of the funnel, so that the card holder is removed and replaced when adding water to the funnel.

3. The invention of claim 2 wherein the set of support legs are augmented by clip means extending from an intermediate portion of the card holder structure, and wherein the foam material is plastic.

4. The invention of claim 2 wherein the support means includes a set of support legs at the other end and for frictionally engaging the funnel walls along opposite sides thereof.

5. The invention of claim 2 wherein the card holder means is generally flat throughout and has a slit for receiving a card, the holder and the card having informational indicia thereon.

6. The invention of claim 2 wherein the card holder means includes clip means for frictionally securing contact onto the funnel by means of an inturned end.

7. A card holder arrangement for cut flowers and use with a structure for funnelling water into a body of foam plastic material which foam plastic material is for receiving cut ends of cut flowers, the arrangement comprising a card holder means formed as a molded means being oblong and having a free end for supporting a card and support means at another end terminating in a means for being secured to the funnel, the card holder means including a C-shaped cut for receiving and resiliently holding a card in the C-shaped cut, a funnel formed of molded material, the funnel having a large opening for receiving water and a small opening for passing water therethrough, a tubular member having an opening at its upper end for receiving the small opening of the funnel and for passing water through the tubular member and for exit of the water at the lower end onto a body of foam plastic, and an elongated insertion means being received into the lower end of the tubular member for allowing the passage of water and for insertion into said body of foam plastic material, the insertion means having barrier means intermediate its length for limiting the depth of the insertion means to a proximate surface of the foam plastic material.

8. The invention of claim 7 wherein the holder means is generally flat throughout and has a slit for receiving a card, the holder and the card having informational indicia thereon.

9. The invention of claim 7 wherein the card holder structure includes clip means for frictionally securing contact onto the funnel and the support means includes a set of legs.

* * * * *